US012179918B2

(12) United States Patent
Desjoyeaux et al.

(10) Patent No.: US 12,179,918 B2
(45) Date of Patent: Dec. 31, 2024

(54) METHOD FOR MANUFACTURING A COMPOSITE PREFORM FOR THE MANUFACTURE OF A COMPOSITE PANEL WITH DOUBLE CURVATURE GEOMETRY

(71) Applicant: Safran Nacelles, Gonfreville l'Orcher (FR)

(72) Inventors: Bertrand Leon Marie Desjoyeaux, Moissy Cramayel (FR); Julien Lorrillard, Moissy Cramayel (FR); Benjamin Provost, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 900 days.

(21) Appl. No.: 17/188,482

(22) Filed: Mar. 1, 2021

(65) Prior Publication Data

US 2021/0179256 A1 Jun. 17, 2021

Related U.S. Application Data

(63) Continuation of application No. PCT/EP2019/072893, filed on Aug. 27, 2019.

(30) Foreign Application Priority Data

Aug. 27, 2018 (FR) .................................. 18/57693

(51) Int. Cl.
 *B64C 7/02* (2006.01)
 *B29B 11/16* (2006.01)
 (Continued)

(52) U.S. Cl.
 CPC ................ *B64C 7/02* (2013.01); *B29B 11/16* (2013.01); *B29C 70/222* (2013.01); *B32B 5/073* (2021.05);
 (Continued)

(58) Field of Classification Search
 CPC ......... B64C 7/02; B29B 11/16; B29C 70/222; D04H 3/10; D04H 3/115; B32B 5/073; B32B 5/26; D06C 3/00
 See application file for complete search history.

(56) References Cited

U.S. PATENT DOCUMENTS 8,234,990 B2 * 8/2012 Xie .......................... D04H 3/04
                                                      112/475.08
2015/0174833 A1 * 6/2015 Desjoyeaux .......... B29C 70/021
                                                      425/112

(Continued)

FOREIGN PATENT DOCUMENTS

EP        2546049        1/2013
EP        3168353        5/2017
               (Continued)

OTHER PUBLICATIONS

International Search Report for International Application PCT/EP2019/072893, mailed Nov. 21, 2019.
(Continued)

*Primary Examiner* — Mathieu D Vargot
(74) *Attorney, Agent, or Firm* — Burris Law, PLLC (57) ABSTRACT

A method for manufacturing a preform for producing a part made of composite material with an unchangeable final shape includes supplying a triaxial non-woven textile comprising a layer of fibers orientated in a first direction, a layer of fibers orientated in a second direction, a layer of fibers orientated in a third direction, and seams extending parallel to each other and forming sheaths for the circumferential fibers, arranging the textile on an element of unchangeable shape by placing the seams parallel to the circumferential direction of the element, and sliding the circumferential fibers into the sheaths so that the textile is in continuous contact with the element.

8 Claims, 3 Drawing Sheets

(51) Int. Cl.
  *B29C 70/22*  (2006.01)
  *B32B 5/06*  (2006.01)
  *B32B 5/26*  (2006.01)
  *D04H 3/10*  (2012.01)
  *D04H 3/115*  (2012.01)
  *D06C 3/00*  (2006.01)

(52) U.S. Cl.
  CPC ................. *B32B 5/26* (2013.01); *D04H 3/10* (2013.01); *D04H 3/115* (2013.01); *D06C 3/00* (2013.01)

(56) References Cited

U.S. PATENT DOCUMENTS

2019/0160760 A1* 5/2019 Pages-Xatart .......... B29C 70/38
2019/0168419 A1* 6/2019 Provost ................... B29B 11/16

FOREIGN PATENT DOCUMENTS

FR    2995557    3/2014
FR    3000969    7/2014
RU    2425748    8/2011
RU    2518378    6/2014
RU    2519116    6/2014

OTHER PUBLICATIONS

Long, et al., Characterizing the Processing and Performance of Aligned Reinforcements During Preform Manufacture, Composites, pp. 247-253, vol. 27A(4), Apr. 1, 1996, Business Press Ltd., Haywards Heath, GB.

Search Report issued in corresponding RU Application 2021107032/05, completed Dec. 12, 2022.

* cited by examiner

METHOD FOR MANUFACTURING A COMPOSITE PREFORM FOR THE MANUFACTURE OF A COMPOSITE PANEL WITH DOUBLE CURVATURE GEOMETRY

CROSS-REFERENCE TO RELATED APPLICATIONS

This application is a continuation of International Application No. PCT/EP2019/072893, filed on Aug. 27, 2019, which claims priority to and the benefit of FR 18/57693, filed on Aug. 27, 2018. The disclosures of the above applications are incorporated herein by reference.

FIELD

The present disclosure relates to a method for manufacturing a preform for the manufacture of a non-developable final shape part made of a composite material and a preform thus obtained, along with a part manufactured with the preform.

BACKGROUND

The statements in this section merely provide background information related to the present disclosure and may not constitute prior art.

Non-woven fabrics have the particularity of having in a single ply, layers of fibers in several directions. In other words, the non-woven fabrics are fiber preforms composed by the assembly of several layers of fibers each having a different orientation and held together by sewing threads. The biaxial non-woven fabrics include two layers each of which includes fibers oriented in a different direction, and therefore two different fiber orientations, while tri-axial non-woven fabrics include three layers each of which includes fibers oriented in a different direction, and therefore three different fiber orientations, quadri-axial non-woven fabrics include four layers and therefore four fiber orientations, etc.

Usually, the non-developable final shape parts made of composite material are made from a fabric preform formed from a generally biaxial woven fabric, that is to say comprising two directions of fibers, or from a biaxial non-woven fabric, applied on a non-developable shape element. The fabric preform may be pre-impregnated with resin, or a step of impregnating resin may follow the step of applying the fabric preform on the non-developable shape element. Finally, the non-developable final shape part made of composite material is obtained following a step of polymerizing the resin. This polymerization step can be carried out cold or hot depending on the used resin.

The biaxial woven and non-woven fabrics are capable of unraveling and can therefore be used to manufacture non-developable final shape parts without causing wrinkling or breakage of the fibers.

However, a biaxial fabric includes only two orientations of fibers and therefore offers main orthotropic properties, that is to say in two perpendicular directions of fibers, which do not make it possible to obtain a composite material having good stiffness properties and good mechanical strength. It is then necessary to apply many thicknesses of fabric, according to different orientations of fibers, to obtain good stiffness properties and high mechanical strength.

One solution consists in manufacturing non-developable final shape parts made of a composite material from tri-axial non-woven fabric, also called multiaxial fabric. The difficulty is to avoid fiber breaks because the tri-axial non-woven fabric is non-deformable. To this end, it is known from U.S. Pat. No. 8,234,990 B2 to play on the nature, spacing, tension and/or density of the seams of the tri-axial non-woven fabric.

However, this type of non-woven fabric applied to elements of non-developable shape, more particularly to revolution surfaces having a longitudinal axis, has a tendency to generate fiber corrugations. Such part elements have a curved generatrix whose radius of curvature changes along the longitudinal axis.

It is also known from EP 2 456 049, to use a fiber preform produced flat and then deformed to obtain a three-dimensional fiber preform, in which the fibers are in the form of a fabric comprising several layers of fibers in different orientations, the fibers being interconnected by seams allowing the fibers to slide relative to each other during the deformation.

SUMMARY

This section provides a general summary of the disclosure and is not a comprehensive disclosure of its full scope or all of its features.

The manufacturing method according to the present disclosure is a method for manufacturing a preform for the manufacture of a part made of a composite material of the revolution or quasi-revolution non-developable final shape type, having a longitudinal axis, characterized in that it includes the following steps:

a tri-axial non-woven fabric is provided comprising:
   a first layer comprising so-called circumferential fibers oriented in a first direction,
   a second layer comprising fibers, oriented in a second direction,
   a third layer comprising fibers, oriented in a third direction,
   and seams binding the fibers of the first, second and third layers, the seams extending parallel to each other and forming sheaths for the circumferential fibers,
said fabric is disposed on or in a non-developable shape element, either identical to the desired non-developable final shape, or of reduced dimensions compared to the desired non-developable final shape, by placing the seams parallel to the circumferential direction of the element,
the circumferential fibers are made to slide in the sheaths formed by the seams, so that the fabric is in continuous contact with the non-developable shape element and thus is adapted to the non-developable shape of the non-developable shape element.

Thus, the method according to the present disclosure makes it possible to obtain from a single thickness of fabric, a preform made of composite material whose seams are in directions parallel to each other and form sheaths for strands of fibers, called circumferential, of a first layer of said fabric.

In a single thickness of tri-axial fabric, a preform is thus produced which can have quasi-isotropic mechanical properties in the planes of the fabric.

The expression "quasi-revolution final shape" means a final non-developable shape which is not limited to parts at 360°. It can be portions of revolution parts.

Furthermore, the quasi-revolution shape comprises a set of generatrixes in planes parallel to the longitudinal axis, whose at least one generatrix is a curve of order greater than or equal to two, and whose curves contained in perpendicular planes at the longitudinal axis intercept at least one point of each generatrix.

In one form, the quasi-revolution shape has a tonnoid shape. It can also have local peculiarities such as slight bosses or shrinkage.

The first, second and third layers of fibers constituting the fabric can have different surface masses, or even variable surface masses within the same layer, for example by variation in fiber density within said layer.

The non-developable shape element has a surface close to a revolution surface and a longitudinal axis.

Steps b) and c) allow the fabric to be shaped, so as to obtain the preform.

More particularly, step c) makes it possible to slide the circumferential fibers in their sheaths, which causes an unraveling of the fibers of the second and third layers of the fabric, which are held by the seams.

The term "unraveling" means that the angles of the fibers of the second and third layers, relative to the circumferential fibers, vary within the fabric.

The unraveling is performed according to the gradient of curvature of the non-developable shape element.

Thus, the fabric is pressed against the non-developable shape element.

This shaping is accompanied by relative displacements of the fibers of the different layers of the fabric. The fabric then acquires a non-developable shape identical to that of the non-developable shape element to which it is applied, so as to obtain the preform.

The non-developable shape of the preform is retained, this is referred to as plastic or durable deformation as opposed to elastic deformation, thanks to the friction resulting from the seams binding the fibers of the different layers.

According to other characteristics of the present disclosure, the method includes one or more of the following optional characteristics considered alone or according to all possible combinations.

In a first variant, step c) is carried out by tensioning the circumferential fibers, so as to slide the circumferential fibers in the sheaths formed by the seams and to unravel the fibers of the second and third layers.

According to this variant, the ends of the fibers of the second and third layers can also be held by holding means such as clamps or adhesives.

Advantageously, according to this variant, it is also possible to apply pressure on the fabric in the direction of the non-developable shape element, by means of a pressure such as a bar.

Thus, the pressure makes it possible to keep the fibers of the second and third layers pressed against the non-developable shape element and to promote the sliding of the circumferential fibers and therefore the unraveling of the fibers of the second and third layers.

In another form, the pressure is displaced tangentially to the non-developable shape towards one or more free ends of the preform.

During step c), the fibers of the second and third layers are advantageously put in tension.

In yet another variant, step c) is carried out by putting the fibers of the second and third layers in tension and by applying pressure on the fabric in the direction of the non-developable shape element, by means of a pressure such as a bar, so as to slide the circumferential fibers in the sheaths formed by the seams and to unravel the fibers of the second and third layers.

In another variant, the pressure is displaced tangentially to the non-developable shape towards one or more free ends of the preform.

These variants can also be combined simultaneously or successively or alternately.

The tensioning is advantageously carried out gradually, by pulling on the ends of the circumferential fibers and/or of the fibers of the second and third layers.

The tensioning is applied manually or mechanically.

According to a characteristic, the non-developable shape element is a convex shape element, called male shape element.

According to this characteristic, step c) is carried out by rolling up the fabric about the male shape element.

According to another characteristic, the non-developable shape element is a concave shape element, called female shape element.

According to this characteristic, step c) is carried out by applying at least one roller to the fabric, along the circumference of the female-shape element, to shape the fabric.

In one variant, the non-developable shape element has an identical circumference with respect to the desired non-developable final shape part.

In another variant, the non-developable shape element has a reduced circumference relative to the desired non-developable final shape part.

By "reduced circumference," it is meant that the geometry is reduced compared to the final shape, the radius of curvature being reduced by the same factor.

In the case of the quasi-revolution final shape, the non-developable shape element may have a revolution shape of an identical or reduced circumference with respect to the circumference of the final non-developable shape.

According to a characteristic, during step b) the fabric is blocked against the non-developable shape element, using a blocking means, along a generatrix of the non-developable shape element.

This blocking step is performed either at a central zone of the fabric or at one end of the fabric.

As a result, the fabric has surface masses of fibers per layer of fibers, which are identical or different.

Furthermore, the fabric advantageously has constant or variable surface masses within the same layer of fibers, by variation in the surface density of the fibers.

In one variant, the fibers of the second and third layers have, during step a), angles relative to the circumferential fibers, respectively less than 90° and greater than 90°.

Furthermore, to constitute a balanced distribution of fibers, the angles of the second layer have a value of $\alpha$, while the angles of the third layer have a value of $\beta=180-\alpha$.

In one variant, the $\alpha$ is comprised between 15° and 80°.

In another variant, the seams are in the shape of a chain knit.

The chain-knit shape seams include, in a known manner, a knit pattern, also called a zig-zag, on a first face and a chain pattern on the opposite face.

In this variant, the first layer comprising the circumferential fibers is placed either against the knit pattern of the seams, or between the second and third layers.

According to a characteristic, the fabric further includes at least one strip of additional fibers, whose orientation is perpendicular to the seams.

According to this characteristic, the means for blocking the fabric on the non-developable shape element is placed on this strip of additional fibers.

The present disclosure also relates to a preform obtained by the method as described above.

Such a preform includes a tri-axial fabric including a first layer including circumferential fibers oriented in a first direction, a second layer comprising fibers oriented in a second direction, and a third layer comprising fibers oriented in a third direction, the fibers of the second and third layers having angles relative to the circumferential fibers which are variable within the preform.

The present disclosure also concerns a method for obtaining a part made of a composite material of the revolution or quasi-revolution non-developable final shape type, having a longitudinal axis, characterized in that it includes a step of manufacturing a preform according to the method as described above, and an additional step of applying the preform on a non-developable shape module identical to the desired non-developable final shape part and of consolidation by insertion and hot or cold polymerization of the matrix.

According to a characteristic, during the additional step, several preforms are applied to the non-developable shape module identical to the desired non-developable final shape part.

According to another characteristic, other fabric structures can be added locally.

These other structures are advantageously added in the stack of fabric layers.

Alternatively, at least a portion of these other structures is added on top of the fabric layers.

As a further variant, at least part of these other structures is added below the fabric layers.

The present disclosure further concerns a part made of composite material of the revolution or quasi-revolution non-developable final shape type, manufactured using the preform obtained by the method as described above.

The part made of a composite material of the revolution or quasi-revolution non-developable final shape type, is delimited by a surface defined by a set of generatrixes in planes parallel to the longitudinal axis, whose at least one generatrix is a curve of order greater than or equal to two, and whose curves contained in planes perpendicular to the longitudinal axis intercept at least one point of each generatrix.

In one variant, the part made of composite material has a tonnoid shape.

It can further have local peculiarities such as slight bosses or shrinkage.

The part made of composite material of the revolution or quasi-revolution non-developable final shape type comprises the preform obtained by the method as described above.

The part made of composite material of the revolution or quasi-revolution non-developable final shape type is characterized in that it includes a fabric whose seams form sheaths for the so-called circumferential fibers of the same layer of the fabric, said seams being parallel to the circumferential direction of the part.

This part made of composite material has the characteristic that the fibers do not exhibit wrinkles or breaks. It includes a fabric with fibers of the same layer oriented parallel to each other and parallel to the circumferential direction of the part made of composite material and fibers of two other layers having angles which evolve along the longitudinal direction of the part made of composite material.

The present disclosure also concerns a nacelle comprising a part as described above.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figures 1, 2, 3, 4, 5A:
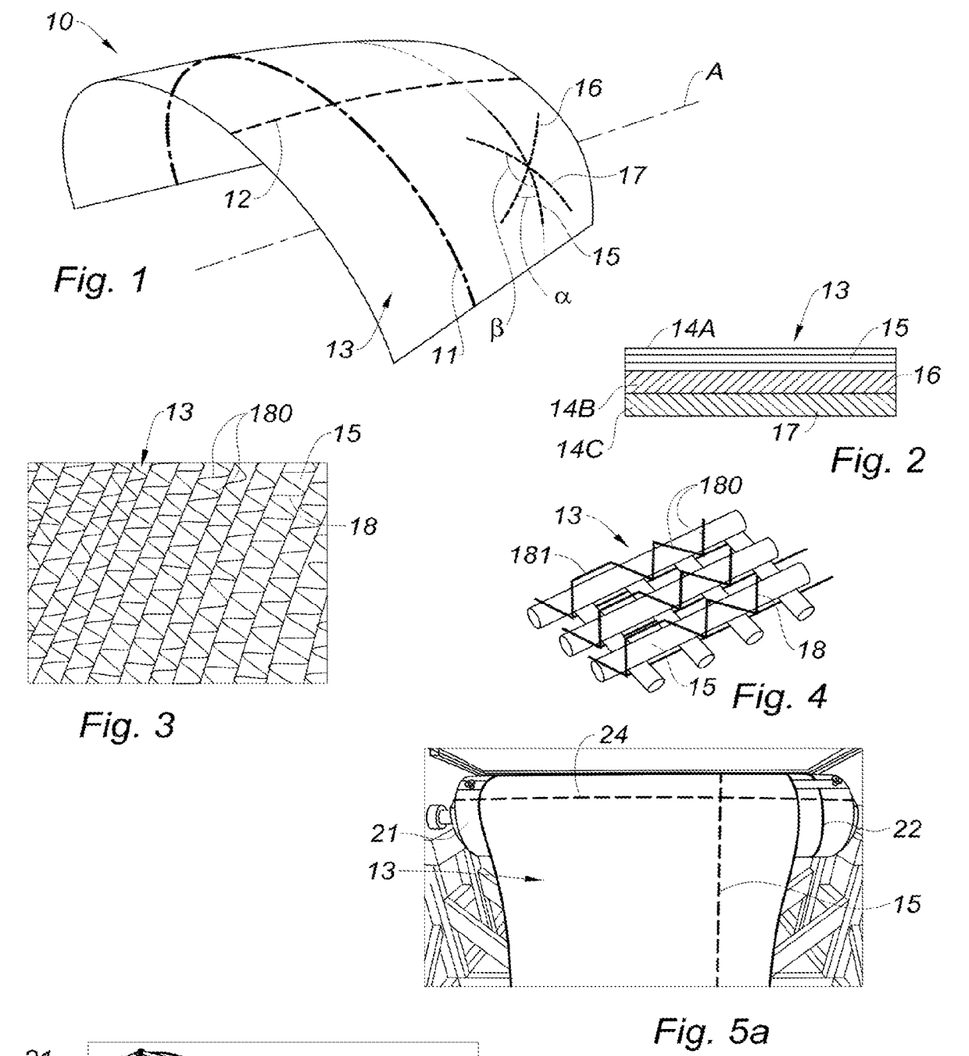
FIG. 1 is a schematic perspective side view of a quasi-revolution non-developable final shape part about a longitudinal axis according to the present disclosure, including a tri-axial non-woven fabric.
FIG. 2 is a schematic sectional view illustrating the fabric used for the manufacture of the part of FIG. 1.
FIG. 3 is a schematic top view of the fabric of FIG. 2.
FIG. 4 is a schematic top view of a variant of the fabric of FIG. 3.
FIGS. 5a, 5b, 6, 7, 8, 9a and 9b illustrate a first variant of the method for manufacturing the part of FIG. 1.

FIG. 1 represents a part 10 of a quasi-revolution non-developable final shape according to the present disclosure.

The part 10 is a panel having the shape of a half barrel.

In one form, the shape of the part 10 may be ovoid or irregular potato-shape.

The part 10 has a longitudinal axis A. It has a circumferential direction 11, and a curved generatrix 12 whose radius of curvature changes along the longitudinal axis A.

The part 10 is made of a composite material. It includes a tri-axial non-woven fabric 13.

The part 10 is draped with a tri-axial non-woven fabric 13.

In one variant, the part 10 made of composite material includes several tri-axial non-woven fabrics 13.

As illustrated in FIG. 2, the tri-axial non-woven fabric 13 used for the manufacture of the part 10, includes a first layer 14A, a second layer 14B and a third layer 14C.

The first, second and third layers 14A, 14B and 14C are superimposed, the first layer 14A being the upper layer, the second layer 14B being the middle layer and the third layer 14C being the lower layer.

Said layers can be called sheets or unidirectional sheets.

Each layer consists of fibers disposed parallel to each other.

The first layer 14A comprises circumferential fibers 15 oriented in a first direction, while the second layer 14B comprises fibers 16 oriented in a second direction and the third layer 14C comprises fibers 17 oriented in a third direction.

The circumferential fibers 15 and the fibers 16 and 17 of the second and third layers are disposed superimposed in planes parallel to each other.

The fibers 16 of the second layer 14B form an angle α (FIG. 1) with the circumferential fibers 15 and the fibers 17 of the third layer 14C form an angle β (FIG. 1) with the circumferential fibers 15.

The angle β is generally equal to 180−α, and in one form α=60°, so as to obtain a quasi-isotropic behavior in the plane of the fabric 13.

The first layer 14A including the circumferential fibers is, in one form, an upper layer of the fabric 13.

The fibers 15, 16 and 17 of said layers 14A, 14B and 14C are grouped together in strands which are connected together by seams 18 (FIG. 3).

As shown in FIG. 3, the seams 18 are knit-shape on a first side of the tri-axial non-woven fabric 13, while they are chain-shaped (not shown) on a second side (not shown) of the tri-axial non-woven fabric 13, the second face being opposite to the first face.

The chain shape corresponds to parallel lines of so-called chain stitches, while the knit shape corresponds to transverse segments 180 connecting two adjacent chain stitches.

In a variant represented in FIG. 4, the knit shape corresponds to an alternation of transverse segments 180 and longitudinal segments 181.

The seams 18 extend parallel to each other and parallel to the circumferential fibers 15 of the first layer 14A.

The first layer 14A including the circumferential fibers 15 is positioned in contact with the knit pattern, that is to say in contact with the transverse segments, of the seams 18.

Thus, the first layer 14A including the circumferential fibers 15 is positioned between the transverse segments of the seams 18 and the second layer 14B, which is disposed between the first layer 14A and the third layer 14C, which is itself disposed between the second layer 14B and the chain stitches of the seams 18.

The transverse segments 180 of the seams 18 and the fibers 16, 17 of the second and third layers 14B, 14C, then form sheaths for strands of circumferential fibers 15.

Said strands of circumferential fibers 15 are encased by the sheaths thus formed.

In a variant not shown, the first layer 14A including the circumferential fibers 15 is positioned between the second and third layers 14B and 14C.

According to this variant, the seams 18 can be in independent parallel lines on the two faces of the fabric 13, that is to say formed, for example, of straight chains comprising on one face only segments 181 parallel to the circumferential fibers 15 and chain loops on the other face.

The fibers 16, 17 of the second and third layers 14B, 14C then form sheaths between two seam lines 18 for strands of circumferential fibers 15.

Referring to FIG. 1, the circumferential fibers 15 are parallel to the circumferential direction 11 of the part 10.

Figure 5B:
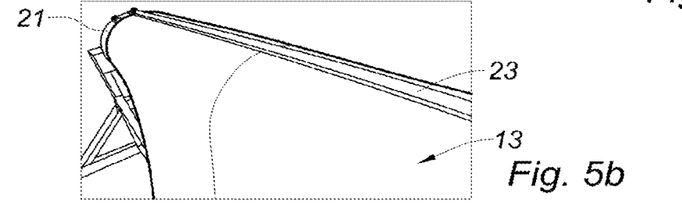

FIGS. 5a and 5b illustrate a first step of a first variant of the method for obtaining the part 10, in which the tri-axial non-woven fabric 13 is placed, in the shape of a strip having two opposite ends 20A and 20B (FIG. 6), on a roller 21 of non-developable shape having a revolution surface of reduced dimensions compared to the desired final non-developable shape and having a circumferential direction 22, by placing the circumferential fibers 15 parallel to the circumferential direction 22 of the roller 21.

This first step corresponds to step b) as presented above in relation to obtain a preform.

The roller 21 of non-developable shape then has a dome shape or male shape.

This first variant is called dome forming.

The roller has a tonnoid shape.

The tri-axial non-woven fabric 13 is blocked against the roller 21 by a clamped bar 23 (FIG. 5b), along a generatrix 24 of the roller 21 (FIG. 5a).

Figure 6:
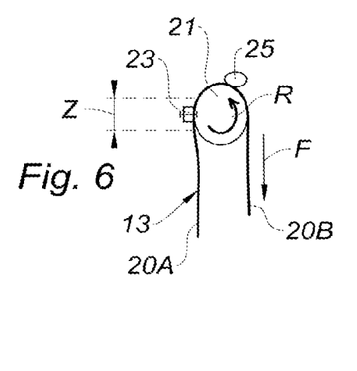

In the example of FIG. 6, the clamped bar 23 blocks the tri-axial non-woven fabric 13 at a central zone Z of said tri-axial non-woven fabric 13.

Thus, the ends 20A and 20B are free.

FIG. 6 illustrates a second step of the first variant of the method for obtaining the part 10, in which a tension is applied in the direction of the arrow F on the end 20B of the circumferential fibers 15, by causing the roller 21 to pivot along the arrow R.

This second step corresponds to step c) as presented above in relation to obtain a preform.

This tension allows the circumferential fibers 15 to slide in their sheaths formed by the seams 18, so that the tri-axial non-woven fabric 13 is pressed against the roller 21.

The tri-axial non-woven fabric 13 is then in continuous contact with the roller 21.

During the sliding of the circumferential fibers 15, the fibers 16 and 17 of the second and third layers of the tri-axial non-woven fabric 13 are unraveled as a function of the local perimeters of the roller 21.

Indeed, the fibers 16 and 17 of the second and third layers are retained by the seams 18.

Figure 10:
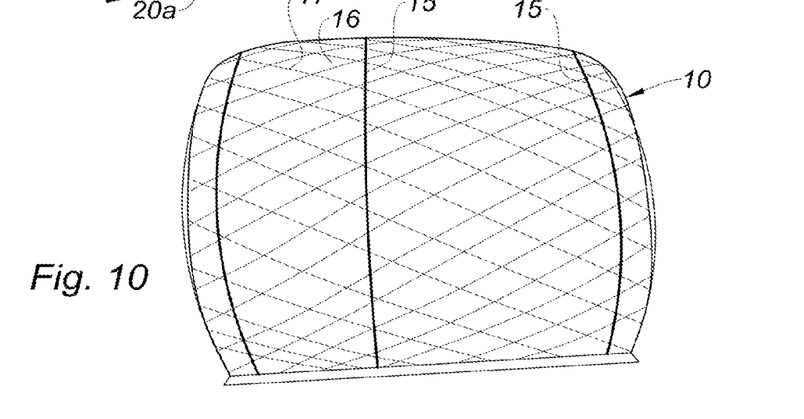
FIG. 10 is a schematic side view of the part of FIG. 1, illustrating the angles between the circumferential fibers and the fibers of the second and third layers.

Thus, the angles α and β formed between the fibers 16 and 17 respectively of the second and third layers, and the circumferential fibers 15, vary within the tri-axial non-woven fabric 13 (FIG. 10).

During this second step, it is also possible to use a bar 25 to apply pressure on the tri-axial non-woven fabric 13 in the direction of the roller.

Holding means such as clamps or adhesives (not shown) make it possible to hold the ends of the fibers 16 and 17 of the second and third layers 14B and 14C.

These holding means also make it possible to apply tensions on the ends of fibers 16 and 17 of the second and third layers 14B and 14C to promote the plating on the shape of the roller 21.

Figure 7:
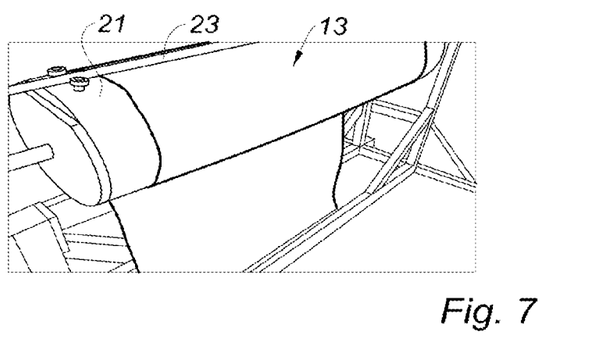

FIG. 7 illustrates the tri-axial non-woven fabric 13 thus rolled up about the roller 21.

The portion of tri-axial non-woven fabric 13 between the central zone Z and the end 20B of the tri-axial non-woven fabric 13 having been shaped about the roller is blocked against the roller 21 by applying an adhesive or a clamped bar (not shown), among others, that can be removed, so as to keep the tri-axial non-woven fabric 13 rolled up around the roller 21. The end 20B is then reversibly blocked.

During this second step, the part of tri-axial non-woven fabric 13 is then rolled up between the central zone Z and the opposite end 20A of the tri-axial non-woven fabric 13 around the roller 21 by pivoting said roller 21 in the direction reverse of the arrow R (FIG. 6), although this is not shown, so as to shape the rest of the tri-axial non-woven fabric 13 around the roller 21.

Figure 8:
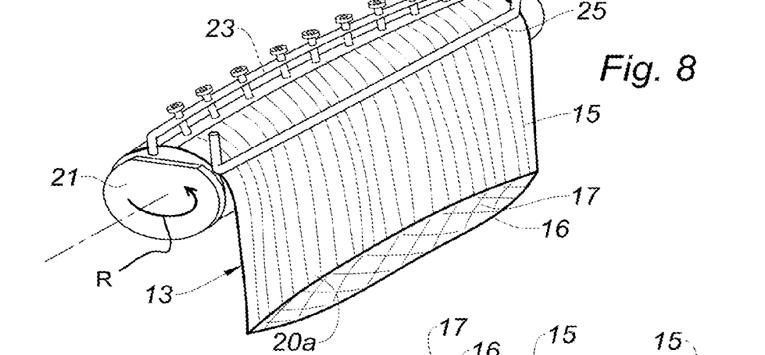

At the end of this second step, the tri-axial non-woven fabric 13 is shaped, as illustrated in FIG. 8.

FIG. 8 shows that the circumferential fibers 15 have slipped in the sheaths relative to the fibers 16, 17 of the second and third layers 14B, 14C after shaping about the roller 21 of a non-developable shape.

Before shaping, the ends of the circumferential fibers 15 would have been aligned.

In a variant not shown, the first layer 14A is locally unbound from the second and third layers 14B, 14C, in the vicinity of the ends of the fibers 15, so as to facilitate the gripping of the fibers of these different layers, for the application of the tension or their holding.

In another variant not shown, the lateral edges of the fabric 13, only include fibers 16, 17 of the second and third layers 14B and 14C, without circumferential fibers 15, so as to facilitate the gripping of the fibers of the second and third layers 14B and 14C independently of the circumferential fibers 15.

A preform 26 (FIG. 9a) of tri-axial non-woven fabric 13 is obtained, whose angles α and β are variable within the tri-axial non-woven fabric 13.

Figure 9A:
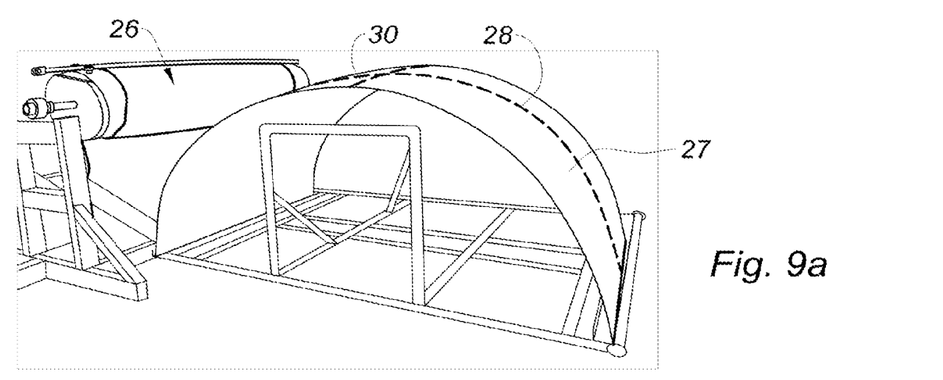
Figure 9B:
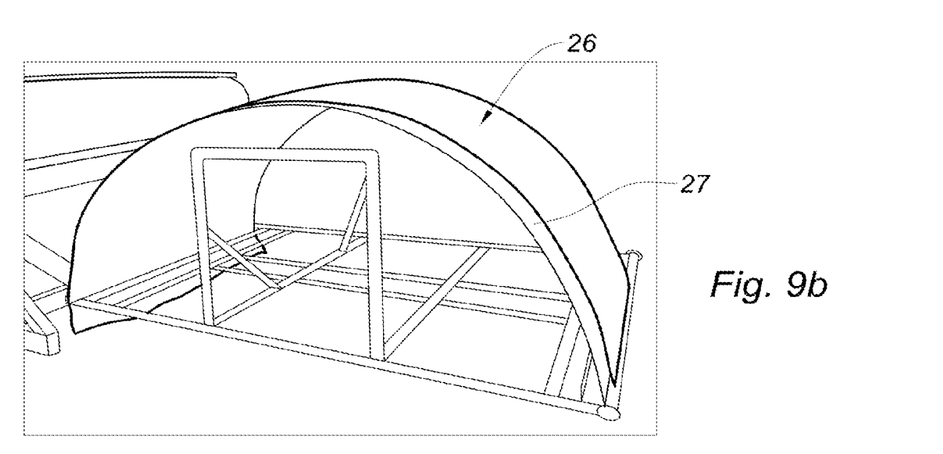

FIGS. 9a and 9b illustrate a third step of the first variant of the method for obtaining part 10, in which the preform 26 is applied to a module 27 identical to the part 10 of the desired final non-developable shape.

This third step corresponds to the additional step as presented above in relation to obtain a part made of a composite material of the revolution or quasi-revolution non-developable final shape type.

The preform 26 is applied by disposing the seams 18 parallel to the circumferential direction 28 of the module 27.

The module 27 then has a dome shape or male shape.

During this third step, the application of the preform 26 on the module 27 is called dome draping.

As a variant, the preform 26 can be applied in a module identical to the part 10 of the desired non-developable final shape.

The module then has a cradle shape or female shape.

The preform 26 matches the shape of the module. It is in continuous contact with the module.

This third step is followed by a resin impregnation step and then by a polymerization step, so as to obtain the part 10 according to the present disclosure, as illustrated in FIG. 1.

FIG. 10 illustrates the variations of angles α and β between circumferential fibers 15 and fibers 16 and 17 of the second and third layers.

The angles α between the circumferential fibers 15 and the fibers 16 of the second layer vary between −15° and +15° with respect to the initial orientations of the tri-axial non-woven fabric before shaping. The angle change is desired to achieve the double curvature.

The angles β between the circumferential fibers 15 and the fibers 17 of the third layer vary in the same way as the angles between the circumferential fibers 15 and the fibers 16 of the second layer.

Figure 11:
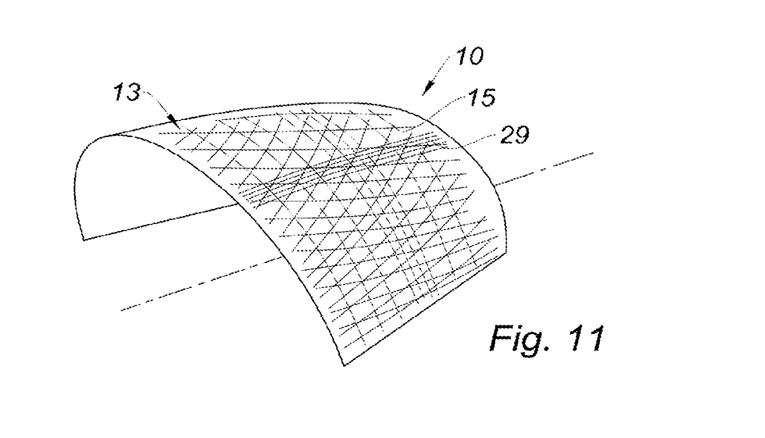
FIG. 11 is a partial schematic view of the part of FIG. 1, including a strip of additional fibers.

FIG. 11 illustrates a variant of part 10 including a tri-axial non-woven fabric 13 including a strip of additional fibers 29 whose orientation is perpendicular to the circumferential fibers 15.

According to this variant, the clamped bar 23 (FIG. 6) of the tri-axial non-woven fabric 13 on the roller 21 is disposed on this strip of additional fibers 29, or close to it.

The strip of additional fibers 29 is, in one variant, disposed in a zone with little unraveling.

It has the effect of further blocking the deformation of the tri-axial non-woven fabric due to the fourth fiber direction. This strip is, in one variant, narrow with respect to the dimensions of the fabric and to the circumference of the roller 21.

In a second variant, not shown, of the method for obtaining the part 10, the first step consists in placing the tri-axial non-woven fabric 13, in the form of a strip having two opposite ends 20A and 20B (FIG. 6), directly on the module 27 (FIGS. 9a, 9b) identical to the part 10 of the desired final non-developable shape, by placing the circumferential fibers 15 parallel to the circumferential direction 28 of the module 27.

In this first step, the tri-axial non-woven fabric 13 is held pressed against the module 27 by a clamped bar (not shown), along a generatrix 30 of the module 27.

The clamped bar blocks the tri-axial non-woven fabric 13 at one end 20A of said tri-axial non-woven fabric 13.

The second step then comprises of applying a tension in the opposite direction to the blocked end 20A, on the free end 20B of the circumferential fibers 15.

As a variant, during the first step, the clamped bar blocks the tri-axial non-woven fabric 13 at a central zone of the tri-axial non-woven fabric 13.

According to this variant, the second step consists in applying a tension at the level of the two ends 20A, 20B of the circumferential fibers 15.

This tension allows the circumferential fibers 15 to slide in their sheaths formed by the seams 18, so that the tri-axial non-woven fabric 13 is pressed against the module 27.

The tri-axial non-woven fabric 13 is then in continuous contact with the module 27.

The tension is gradually applied to the ends of the circumferential fibers 15, along the longitudinal axis (not shown) of the module.

During the sliding of the circumferential fibers 15, the fibers 16 and 17 of the second and third layers of the tri-axial non-woven fabric 13 are unraveled according to the local perimeters on the module 27.

Thus, the angles α and β formed between the fibers 16 and 17 respectively of the second and third layers, and the circumferential fibers 15, vary within the tri-axial non-woven fabric 13 (FIG. 10).

During this second step, a bar (not shown) exerts pressure on the tri-axial non-woven fabric 13 in the direction of the module 27.

Holding means such as clamps or adhesives (not shown) make it possible to hold the ends of the fibers 16 and 17 of the second and third layers 14B and 14C.

At the end of this second step, the tri-axial non-woven fabric 13 is shaped.

This step is followed by a resin impregnation step then by a polymerization step, so as to obtain the part 10 according to the present disclosure, as illustrated in FIG. 1.

In a third variant not shown, the first step consists in disposing the tri-axial non-woven fabric 13, in the form of a strip having two opposite ends 20A and 20B (FIG. 6), in an element of non-developable female or cradle shape, which may be identical to the desired final non-developable shape.

As a variant, the female shape has a revolution surface of reduced dimensions compared to the desired non-developable final shape.

According to this variant, the tri-axial non-woven fabric 13 is clamped against the element by a clamped bar, along a generatrix of the element.

A tension is then applied on the circumferential fibers 15 by clamping the tri-axial non-woven fabric 13 against the cradle element, while applying the tri-axial non-woven fabric 13 along the surface of the female shape by pressing rollers or pushing elements, or by displacing the clamping bar along the circumferential direction of the element.

In this way, the tri-axial non-woven fabric 13 is gradually pressed into continuous contact with the surface of the female shape.

The parts 10 according to the present disclosure do not only include tri-axial non-woven fabric 13. They can also include other layers of fibers of other materials, and/or biaxial woven or non-woven fabrics.

In variants not shown, the non-woven fabric could be one or more quadri-axial non-woven fabric.

Further, in other variations, the non-woven fabric could be a tri-axial multilayer fabric, that is to say including three directions of fibers, but more than three layers of fibers. For example the non-woven fabric may be a tri-axial penta-layer including one layer 14A comprising circumferential fibers 15 oriented in a first direction, two layers 14B comprising fibers 16 oriented in a second direction, and two layers 14C comprising fibers 17 oriented in a third direction.

According to this example, the layer 14A comprising the circumferential fibers 15 oriented in a first direction is disposed between the layers 14B and 14C comprising the fibers 16 and 17 oriented in the other directions, said layers 14B and 14C being alternated. Thus, resulting in the following stack:

layer 14B including the fibers 16 oriented in the second direction, layer 14C including the fibers 17 oriented in the third direction, layer 14A including the circumferential fibers 15 oriented in the first direction, layer 14C including the fibers 17 oriented in the third direction, layer 14B including the fibers 16 oriented in the second direction.

This sequence offers a so-called "mirror" stack balanced in the direction of thickness.

The method presented above on a double curvature shape including a so-called tonnoid convex face, also applies to shapes having curved generatrixes such as diabolo shapes, or shapes with corrugated generatrixes then including parts which can be compared to tonnoid shapes and parts comparable to diabolo shapes.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A manufacturing method for manufacturing a preform for the manufacture of a part made of a composite material of a revolution or quasi-revolution non-developable final shape type, having a longitudinal axis, the manufacturing method comprising:
    a) providing a tri-axial non-woven fabric comprising:
        a first layer comprising circumferential fibers oriented in a first direction,
        a second layer comprising fibers, oriented in a second direction,
        a third layer comprising fibers, oriented in a third direction, and
        seams binding the fibers of the first layer, the second layer and third layer, the seams extending parallel to each other and forming sheaths for the circumferential fibers,
    b) disposing the tri-axial non-woven fabric on or in a non-developable shape element, either identical to a non-developable final shape, or of reduced dimensions compared to the non-developable final shape, by placing the seams parallel to a circumferential direction of the non-developable shape element, and
    c) sliding the circumferential fibers in the sheaths formed by the seams, so that the tri-axial non-woven fabric is in continuous contact with the non-developable shape element and is adapted to a non-developable shape of the non-developable shape element to manufacture the preform.

2. The manufacturing method according to claim 1, wherein c) is carried out by tensioning the circumferential fibers, so as to slide the circumferential fibers in the sheaths formed by the seams and unraveling the fibers of the second layer and the third layer.

3. The manufacturing method according to claim 1, wherein a pressure is produced on the tri-axial non-woven fabric in the direction of the non-developable shape element, by a bar.

4. The manufacturing method according to claim 1, wherein during c) the fibers of the second layer and the third layer are put in tension.

5. The manufacturing method according to claim 1, wherein the non-developable shape element is a convex shape element.

6. The manufacturing method according to claim 1, wherein the non-developable shape element is a concave shape element.

7. The manufacturing method according to claim 1, wherein the non-developable shape element has a reduced circumference with respect to the part of the non-developable final shape.

8. The manufacturing method according to claim 1, wherein the non-developable shape element has a circumference identical to the part of the non-developable final shape.

* * * * *